US012615635B2

(12) United States Patent
Raut Mulgaonkar et al.

(10) Patent No.: US 12,615,635 B2
(45) Date of Patent: Apr. 28, 2026

(54) METHOD AND SYSTEM FOR DYNAMIC SIGNALING OF INDICATED TCI STATES TO RECEIVE PDSCH IN m-TRP

(71) Applicant: Samsung Electronics Co., Ltd., Gyeonggi-do (KR)

(72) Inventors: Dattaraj Dileep Raut Mulgaonkar, Bangalore (IN); Karthik Muralidhar, Bangalore (IN); Santanu Mondal, Bangalore (IN); Diwakar Sharma, Bangalore (IN); Youngrok Jang, Gyeonggi-do (KR); Kyoungmin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 223 days.

(21) Appl. No.: 18/329,158

(22) Filed: Jun. 5, 2023

(65) Prior Publication Data

US 2023/0397205 A1      Dec. 7, 2023

(30) Foreign Application Priority Data

Jun. 3, 2022    (IN) .............................. 202241031974
May 2, 2023    (IN) .............................. 202241031974

(51) Int. Cl.
| | |
|---|---|
| *H04W 72/1273* | (2023.01) |
| *H04W 72/231* | (2023.01) |
| *H04W 76/20* | (2018.01) |

(52) U.S. Cl.
CPC ..... *H04W 72/1273* (2013.01); *H04W 72/231* (2023.01); *H04W 76/20* (2018.02)

(58) Field of Classification Search
CPC . H04W 72/1273; H04W 76/20; H04W 36/00; H04W 40/36; H04W 52/03; H04W 72/23; H04W 72/231; H04W 72/232
See application file for complete search history.

(56) References Cited

U.S. PATENT DOCUMENTS

2021/0105749 A1    4/2021  Zhou et al.
2022/0159705 A1*   5/2022  Cirik ...................... H04L 5/005
(Continued)

FOREIGN PATENT DOCUMENTS

WO    WO 2021/008433       1/2021
WO    WO 2021/095025       5/2021
(Continued)

OTHER PUBLICATIONS

Moderator (MediaTek), Moderator Summary on Extension of Unified TCI Framework for MTRP (Round 3), R1-2205314, 3GPP TSG RAN WG1 #109-e, May 9-20, 2022, 19 pages.
(Continued)

*Primary Examiner* — Brian T Le
(74) *Attorney, Agent, or Firm* — The Farrell Law Firm, P.C.

(57) ABSTRACT
The disclosure relates to a 5G or 6G communication system for supporting a higher data transmission rate. A method performed by a terminal in a wireless communication system is provided. The method includes receiving, from a BS, RRC information configuring a plurality of TCI states for a PDSCH; receiving, from the BS, DCI indicating at least one TCI state from among the plurality of TCI states, wherein the at least one TCI state is associated with a CORESET pool index; and receiving the PDSCH based on the at least one TCI state.

16 Claims, 9 Drawing Sheets

(56) References Cited

U.S. PATENT DOCUMENTS

| | | | | |
|---|---|---|---|---|
| 2022/0338230 A1* | 10/2022 | Yu | .......................... | H04L 5/0053 |
| 2023/0164786 A1* | 5/2023 | Wang | .................... | H04L 5/0094 |
| | | | | 370/329 |

FOREIGN PATENT DOCUMENTS

| | | |
|---|---|---|
| WO | WO 2021/186725 | 9/2021 |
| WO | WO 2021/206990 | 10/2021 |
| WO | WO 2022/015595 | 1/2022 |

OTHER PUBLICATIONS

International Search Report dated Aug. 31, 2023 issued in counterpart application No. PCT/KR2023/007711, 9 pages.
European Search Report dated Jun. 23, 2025 issued in counterpart application No. 23816420.6-1206, 9 pages.

\* cited by examiner

Figure 6:
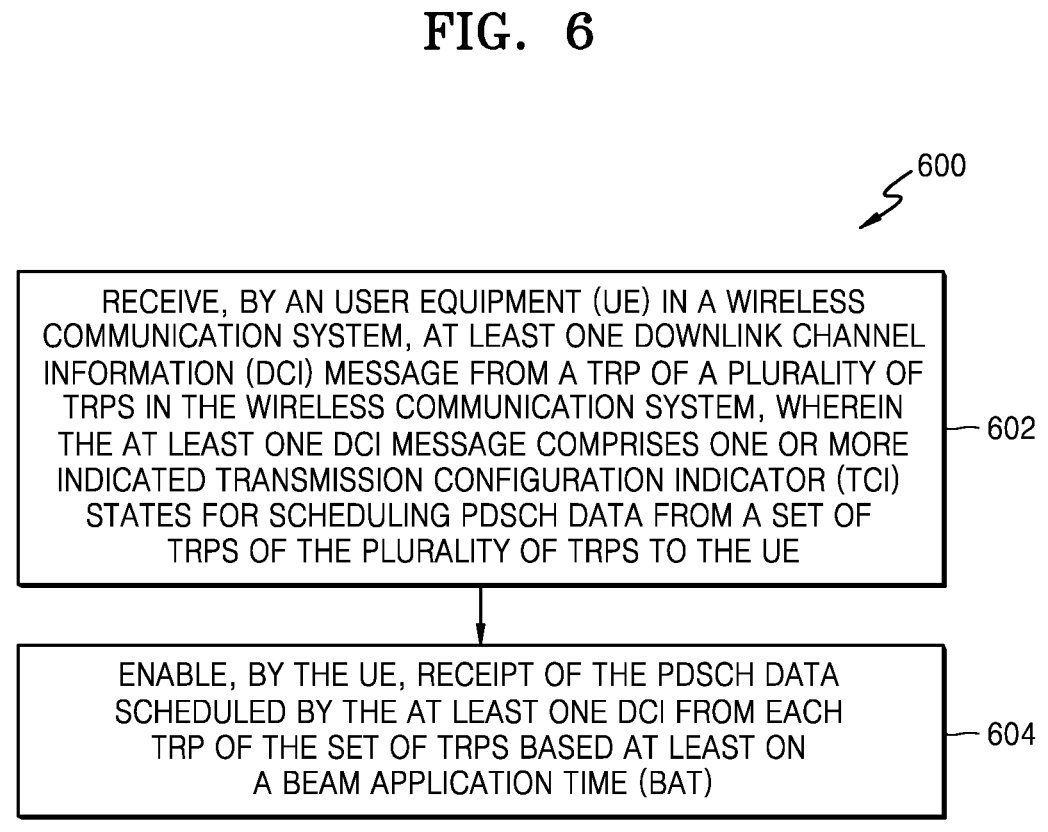

RECEIVE, BY AN USER EQUIPMENT (UE) IN A WIRELESS COMMUNICATION SYSTEM, AT LEAST ONE DOWNLINK CHANNEL INFORMATION (DCI) MESSAGE FROM A TRP OF A PLURALITY OF TRPS IN THE WIRELESS COMMUNICATION SYSTEM, WHEREIN THE AT LEAST ONE DCI MESSAGE COMPRISES ONE OR MORE INDICATED TRANSMISSION CONFIGURATION INDICATOR (TCI) STATES FOR SCHEDULING PDSCH DATA FROM A SET OF TRPS OF THE PLURALITY OF TRPS TO THE UE — 602

ENABLE, BY THE UE, RECEIPT OF THE PDSCH DATA SCHEDULED BY THE AT LEAST ONE DCI FROM EACH TRP OF THE SET OF TRPS BASED AT LEAST ON A BEAM APPLICATION TIME (BAT) — 604

METHOD AND SYSTEM FOR DYNAMIC SIGNALING OF INDICATED TCI STATES TO RECEIVE PDSCH IN m-TRP

CROSS REFERENCE TO RELATED APPLICATION

This application claims priority from Indian Provisional Application No. 202241031974, filed on Jun. 3, 2022, and Indian Non-Provisional Application No. 202241031974, filed on May 2, 2023, the contents of which are incorporated herein by reference.

BACKGROUND

1. Field

The present disclosure relates generally to wireless communication by a user equipment (UE) and base station, and more particularly, to a method and system for dynamic signaling of indicated transmission configuration indicator (TCI) states to receive a physical downlink shared channel (PDSCH) in multiple transmission and reception points (multi-TRP or m-TRP).

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

TCI states include configurations such as quasi co-location (QCL)-relationships between downlink (DL) reference signals (RSs) in one channel state information (CSI) RS set and the PDSCH-demodulation (DM) RS ports. The TCI states are dynamically sent to the user equipment's over a downlink control information (DCI) message. In one of the conventional techniques, in Release 15/16 (i.e., Rel 15/16), the TCI was defined for each control resource set (CORESET). Thus, the physical downlink control channel (PDCCH) sent in a particular CORESET would be received with a TCI state defined for that CORESET. Further, each PDCCH would configure the TCI state for PDSCH. Further, the Rel 15/16 TCI state was based on CORESET, and thus, configures 2 TCI states. When the UE receives two DCI from two different transmit-receive points (TRPs), the TCI states are sent from two different CORESETS, which is included in CORESETPOOLINDEX to identify multiple DCI for UE. Further, each DCI configures an individual PDSCH to receive from m-TRPs. Moreover, since some of the multiple physical channels follow the same TCI state in multiple time slots in Rel 15/16, a new TCI state was configured for each channel in each time slot that was redundant. Also, in Rel 15/16, it was difficult to make measurements and configure the TCI states of the neighboring cell for which a common type of signaling was required. Hence, in order to overcome this issue Release 17 (Rel 17) was introduced.

In Rel 17, unified TCI was introduced to decrease the overhead signaling of TCI for each physical channel and RS. In Rel 17, a new type of TCI states was introduced as a joint TCI state. Thus, any indicated unified TCI state can either be joint TCI state or separate DL/uplink (UL) TCI state. However, in Rel 17, the maximum number of unified TCI states defined was M=1 for DL and N=1 for UL. In Rel 17, with a single unified TCI state, for a single DCI-multi TRP scenario, the single DCI is sent from either of the TRPs to the UE, which schedules two different PDSCHs to the UE. The DCI contains a TCI field which points to single TCI codepoint that contains a pair of TCI states for each TRP. In a single DCI PDCCH repetition case, the two search spaces (SSs) in which PDCCH is repeated are linked in a radio resource control (RRC) level configuration of SS, and in this two SSs belongs to different CORESETS, respectively. The CORESETPOOLINDEX for these two TCI states are different. In a Rel 17 high-speed train (HST) single frequency network (SFN) case, the two PDCCHs, which are repeated in a same time frequency resource element belonging to the same CORESET, have two Rel 15/16 TCI states. Finally, the dynamic indication of a single TRP or multi TRP in DCI is indicated with number of TCI states present in TCI codepoint, indicated in TCI field of DCI format. The update of the TCI state could be via two options, medium access control (MAC) control element (CE) and MAC CE+ DCI 1_1/1_2 (with/without DL assignment). However, this may lead to a problem of updating a single TCI state which may assume a single TRP operation.

Hence, for multi-TRP scenarios, a number of unified TCI states required is more than 1 for the operation. The unified TCI defined in Rel 17, contains one common TCI state for all physical channels and RSs. In Rel 15/16, the TCI framework was unnecessarily modular. The TCI was defined for each CORESET. Thus, the PDCCH sent in a particular CORESET would be received with a TCI state defined for that CORESET. Each PDCCH would then configure the TCI state for PDSCH. The signaling of the TCI state was also revised in Rel 17, as few redundant signaling was not required. In Rel 15/16, TCI states for PDCCH was configured by MAC-CE for each CORESET. RRC signaling was used to configure the few TCI states from all the TCI states pool. For PDSCH, MAC-CE would then configure maximum eight TCI codepoints each for one TCI state. The TCI for PDSCH was indicated in DCI pointing to one of the TCI codepoints. In Rel 17, signaling of TCI states was changed to either MAC CE or MAC CE+ DCI with format 1_1/1_2 with/without DL assignment.

4

SUMMARY

There exists a need for an efficient method and system to increase the TCI states for multi-TRP operation, and to receive PDSCH in a different multi-TRP scenario with both multi and single DCI.

In accordance with an aspect of the disclosure, a method performed by a terminal in a wireless communication system is provided. The method includes: receiving, from a BS, RRC information configuring a plurality of TCI states for a PDSCH; receiving, from the BS, DCI indicating at least one TCI state from among the plurality of TCI states, wherein the at least one TCI state is associated with a CORESET pool index; and receiving the PDSCH based on the at least one TCI state.

In accordance with another aspect of the disclosure, a method performed by a base station in a wireless communication system is provided. The method includes: transmitting, to a terminal, RRC information configuring a plurality of TCI states for a PDSCH; transmitting, to the terminal, DCI indicating at least one TCI state from among the plurality of TCI states, wherein the at least one TCI state is associated with a CORESET pool index; and transmitting the PDSCH according to the at least one TCI state.

In accordance with another aspect of the disclosure, a terminal in a wireless communication system is provided. The terminal includes a transceiver and a controller coupled with the transceiver. The controller is configured to: receive, from a BS, RRC information configuring a plurality of TCI states for a PDSCH, receive, from the BS, DCI indicating at least one TCI state from among the plurality of TCI states, wherein the at least one TCI state is associated with a CORESET pool index, and receive the PDSCH based on the at least one TCI state.

In accordance with another aspect of the disclosure, a base station in a wireless communication system is provided. The base station includes a transceiver; and a controller coupled with the transceiver. The controller is configured to: transmit, to a terminal, RRC information configuring a plurality of TCI states for a PDSCH; transmit, to the terminal, DCI indicating at least one TCI state from among the plurality of TCI states, wherein the at least one TCI state indicated by the DCI is associated with a CORESET pool index; and transmit the PDSCH according to the at least one TCI state.

BRIEF DESCRIPTION OF THE DRAWINGS

The above and other aspects, features, and advantages of certain embodiments of the disclosure will be more apparent from the following description taken in conjunction with the accompanying drawings, in which.

5

Figure 4:
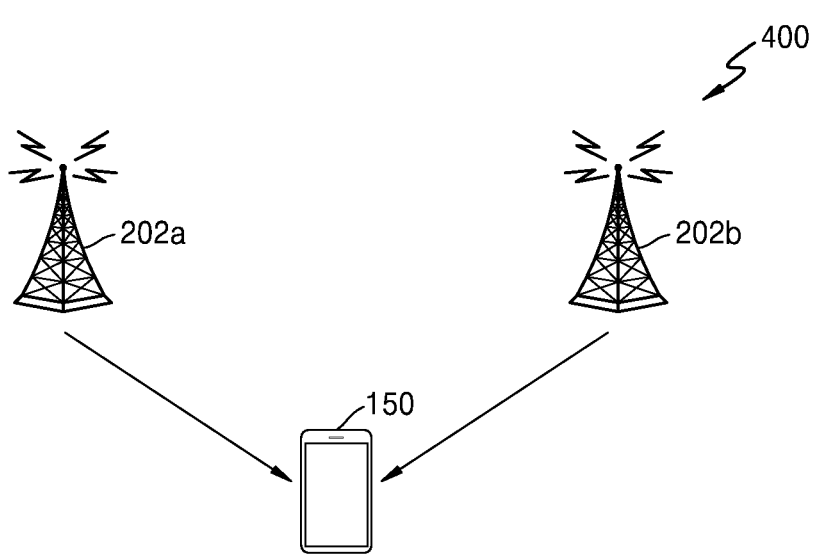
Figure 5:
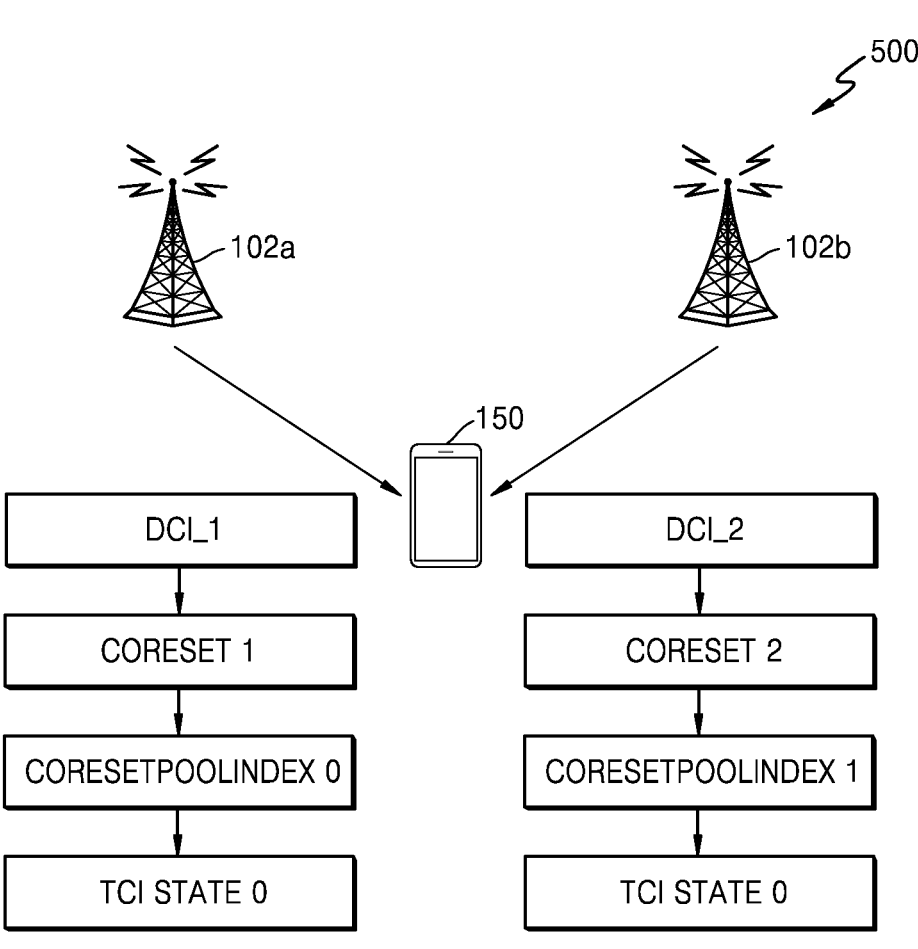
Figure 7:
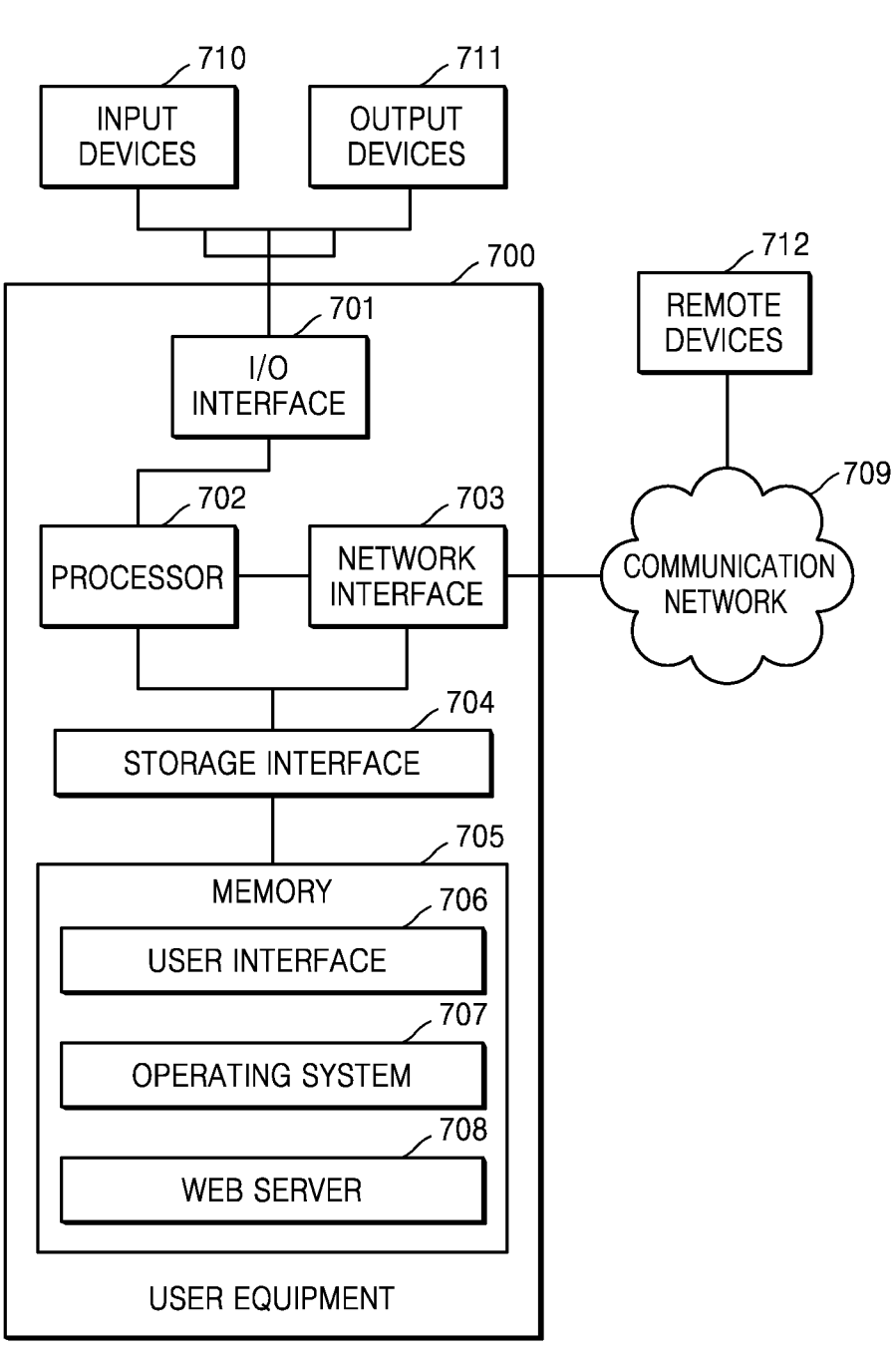

FIG. 4 is a diagram illustrating signaling of one or more indicated TCI states to receive PDSCH data from one or more TRPs, according to an embodiment;

FIG. 5 is a diagram illustrating signaling of one or more indicated TCI states to receive PDSCH data from m-TRPs with a single DCI, according to an embodiment;

FIG. 6 is a flowchart illustrating a method for enabling PDSCH data from m-TRPs, according to an embodiment; and FIG. 7 shows a block diagram of a UE enabling PDSCH data from m-TRPs, according to an embodiment.

DETAILED DESCRIPTION

Herein, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such a setup, device, or method. In other words, one or more elements in a device or system or apparatus proceeded by "comprises . . . a" does not, without more constraints, preclude the existence of other elements or additional elements in the device, system, or apparatus.

Herein, reference is made to the accompanying drawings that form a part hereof, and in which are shown, by way of illustration, specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown. Throughout the drawings, like reference numerals will be understood to refer to like parts, components, and structures.

For convenience of explanation, the disclosure uses terms and names defined in the 3rd Generation Partnership Project Radio Access Network (3GPP RAN) standards. More specifically, the terms 'PDCCH', 'PDSCH', 'DCI', 'unified TCI state', 'indicated TCI state', 'CORESET', 'CORESET-POOLINDEX', 'TRP', 'time domain resource allocation (TDRA)', 'beam application time' are to be interpreted as specified by the 3GPP RAN standards. The term 'TRP' may refer to a set of TRPs providing service to the UE and is referred to interchangeably as m-TRP herein.

Figure 1:
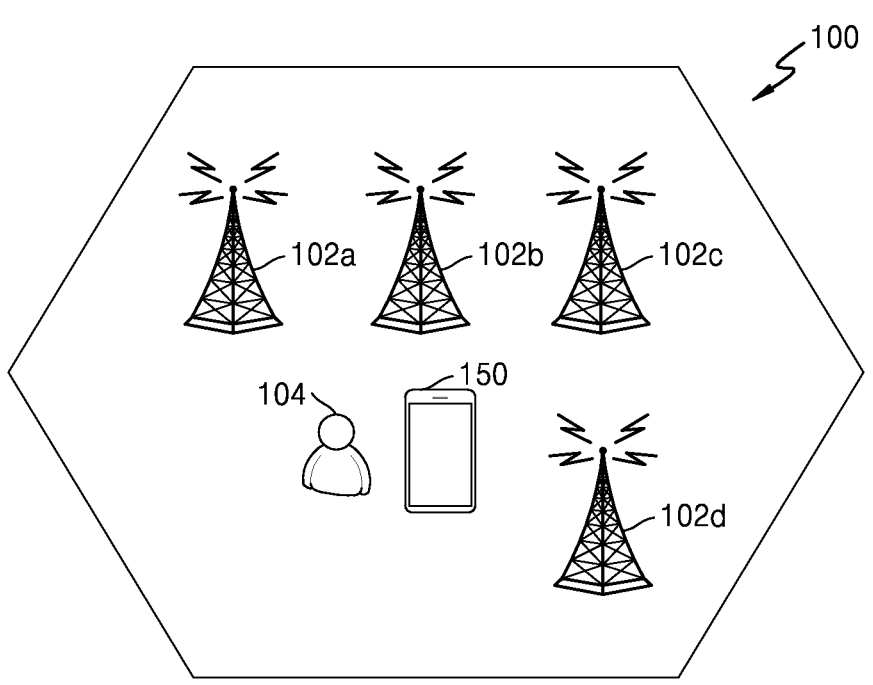
FIG. 1 is a diagram illustrating a schematic representation of a wireless communication system depicting a PDSCH data transmission from multiple-TRPs (m-TRPs) in a 5G network, according to an embodiment.
Figure 2:
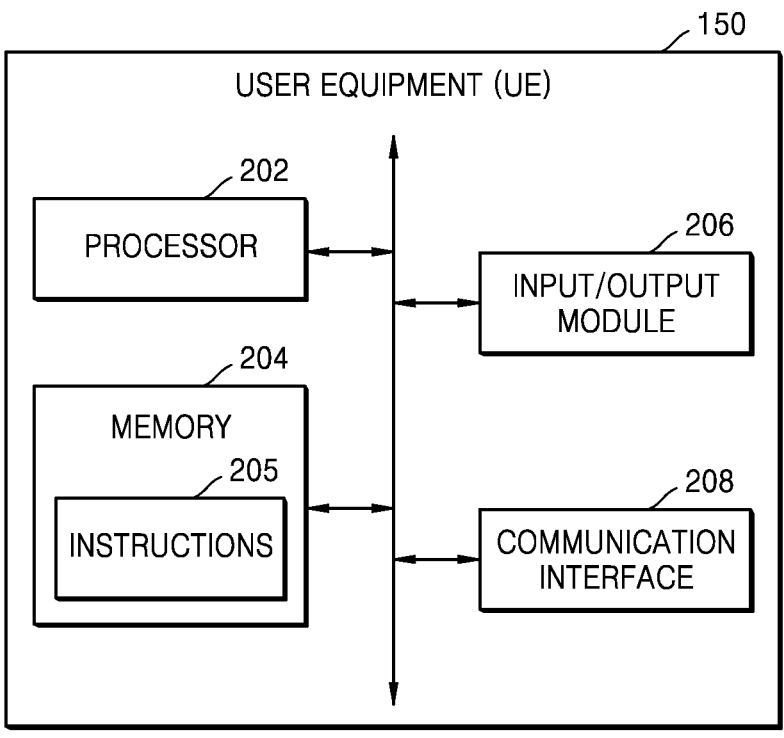
FIG. 2 is a diagram illustrating a UE enabling PDSCH data from m-TRPs, according to an embodiment.

FIG. 2 is a diagram illustrating a wireless communication system, according to an embodiment. A wireless communication system 100 is an example of a 5G communication system. The disclosure relates to a m-TRP scenario in the wireless communication system 100 where more than one TRP intends to provide service (i.e., schedule PDSCH data) for a UE. As such, the wireless communication system 100 depicts a plurality of TRPs, for example, TRPs 102*a*, 102*b*, 102*c*, 102*d* in the wireless communication system 100. The plurality of TRPs (also referred to herein interchangeably as 'multi-TRPs' or 'm-TRPs') are vital in 5G communication systems to improve reliability, coverage, and capacity performance through flexible deployment scenarios.

Accordingly, the plurality of TRPs 102*a*, 102*b*, 102*c*, 102*d* may be located within a cell, such as, for example, a macrocell which spans over a small town. It shall be noted that the TRPs 102*a*, 102*b*, 102*c*, 102*d* are shown for exemplary purposes and there may be a lesser or greater number of TRPs in a cell. Further, it shall be noted that the location of the plurality of TRPs 102*a*, 102*b*, 102*c*, 102*d* within a microcell is shown for exemplary purposes and the plurality of TRPs 102*a*, 102*b*, 102*c*, 102*d* may be located in femtocells, picocells, or microcells. For example, the plurality of TRPs 102*a*, 102*b*, 102*c*, 102*d* may be located in a picocell, which is a small segment of a macro site, such as, for example, a dense urban area such as, stadiums, train stations, malls, and areas with high data capacity requirements and coverage.

In an example, the plurality of TRPs 102*a*, 102*b*, 102*c*, and 102*d* may be located within the cell and provide service to a plurality of UEs located within a predefined distance (i.e., a coverage area). For example, the plurality of TRPs 102*a*, 102*b*, 102*c*, and 102*d* provide services such as viewing/accessing content to plurality of UEs in a picocell, for example, a UE 150 associated with a user 104. Examples of the UE 150 include, but are not limited to, any device used by the user 104 to communicate and/or access content such as, but not limited to, mobile phones, laptops, wearables, IoTs, and the like.

In an example scenario, the user 104 operating the UE 150 may be accessing digital media content (e.g., a movie), while receiving real-time updates of a livestreaming match, and receiving promotional messages from e-commerce websites. The PDSCH data corresponding to the digital media content, live scores of the livestreaming match, and promotional messages from e-commerce websites may be received from a set of TRPs 102*a*, 102*b*, and 102*d* of the plurality of TRPs 102*a*, 102*b*, 102*c*, and 102*d*.

Various embodiments provide an improved method for indicating one or more unified TCI states for scheduling the PDSCH data from the set of TRPs 102*a*, 102*b*, and 102*d* of the plurality of TRPs 102*a*, 102*b*, 102*c*, and 102*d* to the UE 150. In general, at least one DCI message may be used to indicate the one or more unified TCI states to the UE 150. Such a multi-TRP scenario may include, but is not limited to, non-coherent joint transmission, repetition of PDCCH/PDSCH/PUSCH/PUCCH, multi DCI and single DCI and HST. A MAC-CE is used to configure the one or more indicated TCI states in the DCI message to apply the PDSCH associated with scheduling DCI. As such, the UE 150 is configured for receipt of the PDSCH data scheduled by the at least one DCI message from each TRP of the set of TRPs 102*a*, 102*b*, and 102*d* based at least on a beam application time (BAT). As such, a single DCI message may be configured to schedule multiple PDSCH data, or more than one DCI (i.e., multi-DCIs) may be used to enable receipt of the PDSCH data. Enabling of the UE 150 for receiving PDSCH data from the set of TRPs 102a, 102b, and 102d is explained in greater detail below with reference to FIG. 2.

FIG. 2 illustrates the UE 150 for enabling PDSCH data from m-TRPs, in accordance with an embodiment. As described above, the UE 150 may be any device enabled with 5G in the wireless communication system 100 capable of performing one or more of the operations described herein.

The UE 150 is depicted to include a processor 202, a memory 204, an input/output (I/O) module 206, and a communication interface 208. The UE 150 may include more or fewer components than those depicted herein. The various components of the UE 150 may be implemented using hardware, software, firmware or any combinations thereof. Further, the various components of the UE 150 may be operably coupled with each other. More specifically, various components of the UE 150 may be capable of communicating with each other using communication channel media (e.g., buses, interconnects, etc.).

In one embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like.

In one embodiment, the memory 204 is capable of storing machine executable instructions, referred to herein as instructions 205. The processor 202 is embodied as an executor of software instructions. As such, the processor 202 is capable of executing the instructions 205 stored in the memory 204 to perform one or more operations described herein.

The memory 204 can be any type of storage accessible to the processor 202 to perform respective functionalities, as will be explained in detail with reference to FIGS. 3A-3C to 6. For example, the memory 204 may include one or more volatile or non-volatile memories, or a combination thereof. For example, the memory 204 may be embodied as semiconductor memories, such as, for example, flash memory, mask read only memory (ROM), programmable ROM (PROM), erasable PROM (EPROM), random access memory (RAM), and the like. The memory 204 may store a plurality of lookup tables. The plurality of lookup tables include associations such as, but not limited to, between CORESETPOOLINDEX and TCI state, an explicit indication to associate the indicated TCI state and PDSCH through MAC CE, TRP IDs to associate TCI state and PDSCH, explicit indication of CORESET number and TCI state to associate the PDSCH which is related to DCI scheduling of the PDSCH. MAC-CE may be used to configure the associations for receiving the PDSCH.

In an example, a lookup table of the plurality of lookup tables includes mappings that indicate associations between TCI identifiers (IDs) and corresponding indicated TCI states. In another example, a lookup table includes mapping between TRP IDs and TCI states. In yet another example, a look up table includes mappings/associations between CORESETPOOLINDEX and corresponding indicated TCI states. Similarly, another look up table of the plurality of lookup tables includes a mapping between codepoints and corresponding indicates TCI states.

In an embodiment, the processor 202 is configured to execute the instructions 205 for: (1) receiving at least one DCI message from a TRP of a plurality of TRPs 102a, 102b, 102c, 102d, (2) applying each indicated TCI state of one or more indicated TCI states based on at least one DCI message, (3) receiving the PDSCH data from each TRP of the set of TRPs 102a, 102b, 102d on an indicated TCI state associated with PDCCH when PDSCH TDRA scheduled is less than BAT, (4) receiving the PDSCH data from each TRP of the set of TRPs 102a, 102b, 102d on the one or more indicated TCI states scheduled by the at least one DCI message when PDSCH TDRA scheduled is greater than BAT, and (5) applying an indicated TCI state corresponding to a codepoint received in the DCI message.

In an embodiment, the I/O module 206 may include mechanisms configured to receive inputs from and provide outputs to peripheral devices such as the plurality of TRPs 102a, 102b, 102c, 102d and/or the user 104 of the UE 150. To enable reception of inputs and provide outputs to the UE 150, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

In an embodiment, the communication interface 208 may include mechanisms configured to communicate with other entities in the wireless communication system 100 such as, for example, other network nodes or the set of TRPs (i.e., TRPs 102a, 102b, 102c and 102d) for accessing media content, transmitting media content or receiving media content. As such, the communication interface 208 is configured to receive at least one DCI message from a TRP of a plurality of TRPs 102a, 102b, 102c, and 102d in the wireless communication system 100. In an example, a single DCI message is received to schedule PDSCH data from two different TRPs (e.g., TRP 102a and 102b). In another example, two separate DCI messages may be received for scheduling PDSCH data from the two different TRPs (e.g., TRP 102a and 102b). In an embodiment, the DCI message includes at least a first data field, a TCI data field, and a DCI indicating data field. In an embodiment, a list of DCI types and their contents (i.e., the data fields) are defined in 38.212—Table 7.3 of the 3GPP RAN standard. The first data field indicates a number of indicated TCI states to apply in the UE 150 from the at least one DCI message. In an embodiment, when the UE 150 is enabled to receive PDSCH data for multi DCI m-TRP, Single DCI m-TRP and single DCI single TRP scenarios, the first data field indicates how many of the indicated TCI states to apply. The first data field is 1 bit. Table 1 provides values associated with the first data field and functions associated with the bit value.

TABLE 1

| Value | Function |
|---|---|
| 0 | Applies the TCI state of the CORESET in which scheduling DCI was sent or the indicated TCI updated by DCI field in same DCI associated with CORESETPOOLINDEX in which DCI was sent (for single TRP or S-TRP) |
| 1 | Applies Multiple indicated TCI states(mTRP) |

The TCI data field indicates the one or more indicated TCI states to be applied for receiving the PDSCH data from the at least one TRP (e.g., TRP 102a) of the set of TRPs 102a, 102b, 102c, 102d. In an example, the UE 150 may receive 2 DCI messages, where a first DCI message (DCI_1) from TRP 102a includes two indicated TCI states for scheduling PDSCH data from two TRPs (e.g., TRP 102a and 102b) and a second DCI message (DCI_2_) for scheduling PDSCH data from 1 TRP (e.g., TRP 102c). The one or more indicated TCI states are represented as one or more codepoints. In another embodiment, the one or more indicated TCI states of the DCI message are represented as one or more CORESETPOOLINDEX. The CORESETPOOLINDEX or another indicator with same functionality may be used in the DCI message to map the TCI states to receive the PDSCH from m-TRPs.

In an embodiment, the DCI indicating data field is used for dynamic indication of TCI states as associated with one of: a TRP (e.g., TRP 102c), and the set of TRPs (i.e., TRPs 102a, 102b, 102d). Specifically, this new data field (i.e., the DCI indicating data field) in the DCI message is used for dynamic indication of TCI states as associated with a single TRP or m-TRP. It shall be noted that the DCI indicating data field can be applied to both single DCI and multi DCI scenarios of m-TRP. In general, the DCI indicating data field may be used for multi DCI-multi TRP, Single DCI-multi TRP, and single DCI-single TRP scenarios. As such, the DCI indicating data field is used apply the indicated TCI states to receive PDSCH from one or more TRPs. A size of the DCI indicating data field is 2 bits. The values and functions of the DCI indicating data field is as shown in the below Table 2 and Table 3.

TABLE 2

| Value | Function |
|---|---|
| 00 | Apply the TCI states indicated in DCI indicating field |
| 01 | Apply the single TCI state associated with same CORESETPOOLINDEX in which DCI is sent |
| 10 | Apply the single TCI state associated with different CORESETPOOLINDEX other than in which DCI is sent |
| 11 | Apply both the indicated TCI states to receive PDSCH |

TABLE 3

| Value | Function |
|---|---|
| 00 | Apply the TCI states indicated in DCI indicating field |
| 01 | Apply the single TCI state associated with different CORESETPOOLINDEX other than in which DCI is sent |
| 10 | Apply the single TCI state associated with same CORESETPOOLINDEX in which DCI is sent |
| 11 | Apply both the indicated TCI states to receive PDSCH. |

As described above, the communication interface 208 is configured to receive the at least one DCI message from the TRP (e.g., TRP 102a) of the plurality of TRPs 102a, 102b, 102c, and 102d in the wireless communication system 100.

The communication interface 208 forwards the at least one DCI message from the TRP 102a to the processor 202. The processor 202 is configured to process the at least one DCI message for enabling receipt of the PDSCH data from m-TRPs, for example, a set of TRPs (e.g., TRPs 102a, 102b, and 102d) which intend to transmit PDSCH data to the UE 150. The one or more operations described herein are performed by the processor 202 of the UE 150. In general, the processor 202 processes the at least one DCI message with the one or more indicated TCI states and configures the UE 150 for receipt of PDSCH data.

Figure 3A:
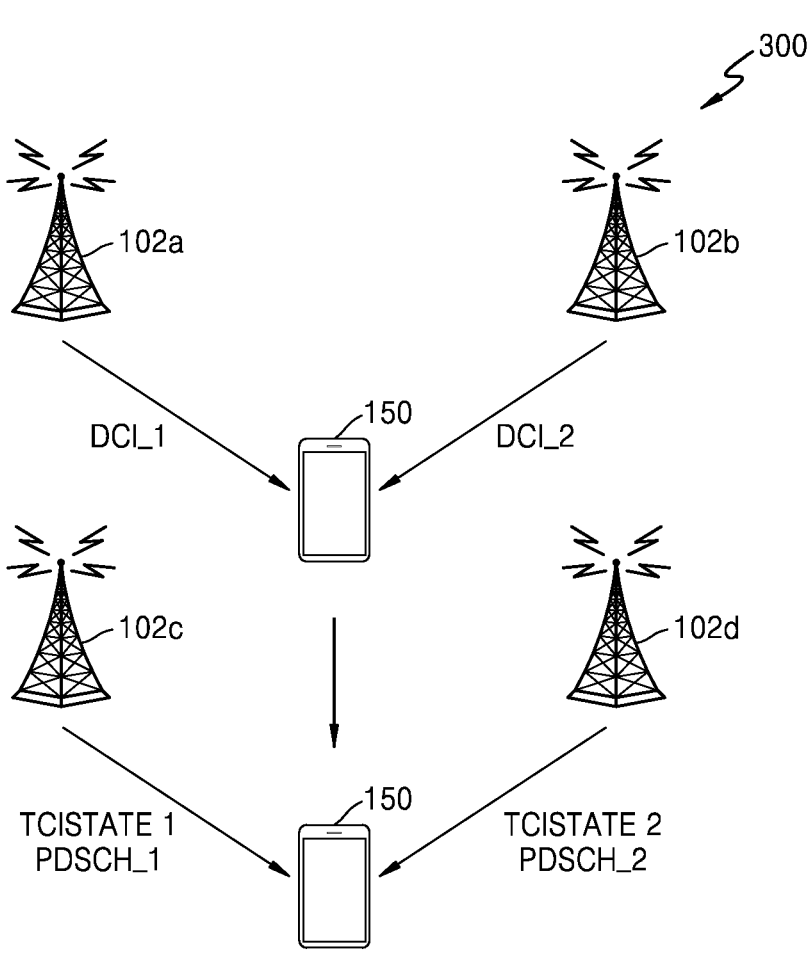
FIG. 3A is a diagram illustrating a method of signaling one or more indicated TCI states to receive PDSCH data from m-TRPs with multi DCI, according to an embodiment.

Referring now to FIG. 3A in conjunction with FIG. 2, a diagram illustrates signaling of one or more indicated TCI states to receive PDSCH data from m-TRPs with multi DCI, according to an embodiment.

In representation 300, two different TRPs 102a and 102b intend to send PDSCH data to the UE 150. As such, each of the TRPs (i.e., TRP 102a and 102b) sends a separate DCI message (i.e., TRP 102a sends DCI_1 and TRP 102b sends DCI_2) to the UE 150. Such a scenario is hereinafter referred to as multi-DCI scenario where m-TRPs individually send DCI messages to the UE 150 for enabling receipt of PDSCH data. The multi-DCI messages received by the UE 150 include two indicated TCI states, where the indicated TCI state may be one of a joint state or a separate state. Further, each DCI message from the two different TRPs 102a and 102b is assigned with a DL assignment scheduling PDSCH data. The UE 150 enables receipt of the PDSCH data scheduled by the at least one DCI (DCI_1 and DCI_2) from each TRP of the set of TRPs 102a and 102b based at least on a BAT. When the DCI messages with DL assignment are received by the UE 150, the UE 150 is enabled to receive the PDSCH data based on the DCI messages.

In an embodiment, the PDSCH data is received from each TRP of the set of TRPs (i.e., TRP 102a and 102b) on an indicated TCI state associated with PDCCH when PDSCH TDRA scheduled is less than the BAT. More specifically, when the UE 150 receives the DCI messages (i.e., DCI_1 and DCI_2) from the TRPs 102a and 102b, the UE 150 applies each indicated TCI state for receiving PDSCH data from corresponding TRP based on the DCI messages (DCI_1 and DCI_2). For example, indicated TCI state in DCI_1 is applied to the UE 150 for receiving PDSCH data from the TRP 102a and indicated TCI state in the TCI state data field of the DCI_2 is applied to the UE 150 for receiving the PDSCH data from the TRP 102b. However, if the PDSCH data from TRP 102a arrives before the indicated TCI state in corresponding DCI message (i.e., DCI_1) is applied to the UE 150, then the PDSCH is received based on the indicated TCI state associated with PDCCH. The UE 150 can individually follow the indicated TCI states associated with CORESETS or a CORESET group in which DCI messages (DCI_1 and DCI_2) are sent, when PDSCH TDRA scheduled is less than the BAT. In such scenarios, each CORESET is associated with CORESETPOOLINDEX or some other parameter having the same functionality of association to indicate the TCI state of CORESETS to the UE 150.

In an embodiment, when PDSCH TDRA scheduled is greater than the BAT, then the PDSCH data is received from each TRP of the set of TRPs 102a and 102b on the one or more indicated TCI states scheduled by the at least one DCI message. For example, if time to receive the PDSCH data is scheduled greater than BAT, then the UE 150 is capable of applying the indicated TCI state_1 in DCI_1 and indicated TCI state_2 in DCI_2. In such a scenario, the PDSCH data is received from TRP 102a on the indicated TCI state_1 that was used for scheduling PDSCH_1 from the TRP 102*a* and from TRP 102*b* on the indicated TCI state_2 that was used for scheduling PDSCH_2 from the TRP 102*b*.

In another embodiment, when PDSCH TDRA scheduled from m-TRPs 102*a*, 102*b* as multi DCI with format 1_1/1_2 (i.e., DCI_1 and DCI_2 with DL assignment) is greater than BAT for a scheduled PDSCH, then the m-TRPs 102*a*, 102*b* from which the DCI_1 and DCI_2 are sent contain TCI field points (e.g. 8 or more (16) TCI codepoints). The TCI codepoints may individually update the indicated TCI states of the associated CORESET or CORESET group and apply the updated indicated TCI state to receive the individual PDSCH scheduled by the corresponding DCI.

In an embodiment, the multi DCI with format 1_1/1_2 with one of the DCI messages scheduling DL assignment, and another DCI message without DL assignment but including an update of TCI state are received by the UE 150. For example, DCI_1 received from TRP 102*a* schedules a DL assignment and DCI_2 received from TRP 102*b* does not have a DL assignment. However, the DCI_2 includes one or more updates for TCI states. Specifically, the DCI sending the TCI update (i.e., DCI_2) includes one or more TCI states. In such scenario, the PDSCH scheduled by the DCI_1 can follow the indicated TCI state associated with the CORESETS or CORESET group in which DCI_1 was sent if the PDSCH TDRA scheduled is less than the BAT. Further, the PDSCH scheduled by the DCI_2 can follow the updated indicated TCI state associated with the CORESETS or CORESET group in which DCI_2 was sent if the PDSCH TDRA scheduled is more than the BAT.

Figure 3B:
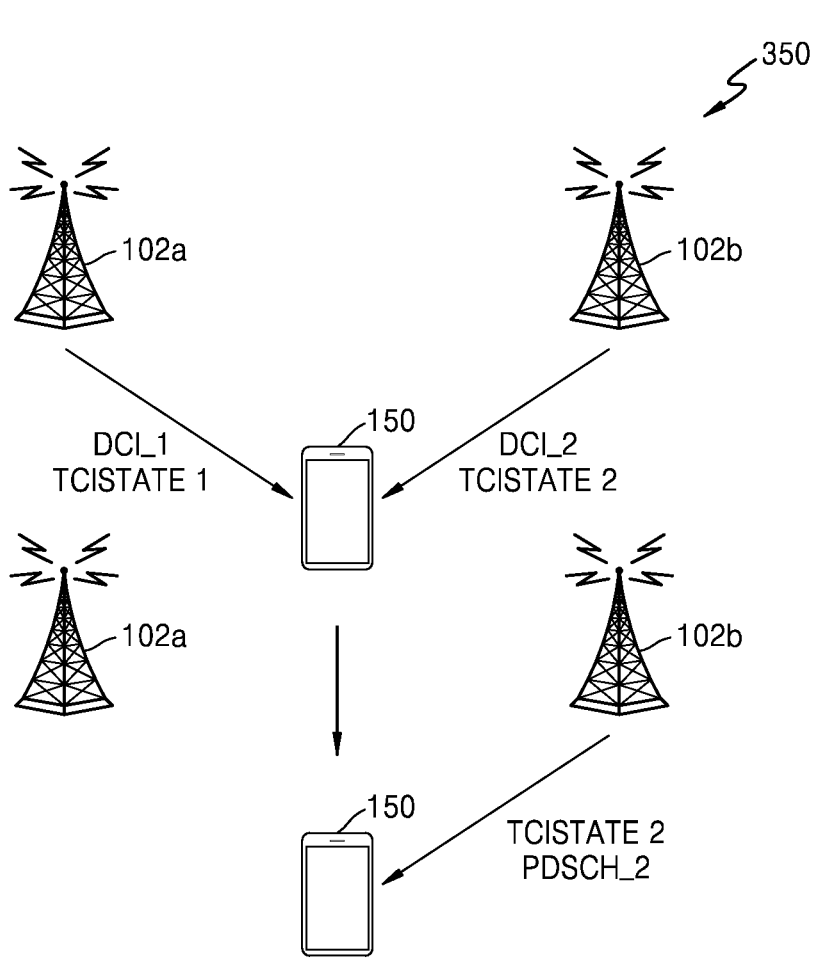
FIG. 3B is a diagram illustrating signaling of one or more indicated TCI states to receive PDSCH data from m-TRPs with multi DCI, according to an embodiment.

Referring now to FIG. 3B in conjunction with FIG. 2, a diagram illustrates signaling of one or more indicated TCI states to receive PDSCH data from m-TRPs with multi DCI, according to an embodiment. In representation 380, one DCI message from a TRP does not include a downlink assignment (DLA) and only a single PDSCH is scheduled. In such a scenario where the single PDSCH is scheduled, one of the DCI messages includes the DL assignment and the other DCI message does not include the DL assignment. In such cases, the multi DCI with format 1_1/1_2 with one of the DCI scheduling with DL assignment or without DL assignment, may follow the indicated TCI state associated with the CORESET or CORESET group in which DCI was sent if PDSCH TDRA scheduled is less than the BAT. If the PDSCH TDRA scheduled is greater than the BAT, then the DCI with format 1_1/1_2 with DL assignment scheduling PDSCH is sent from same TRP, containing TCI field points to one of the 8 or more (e.g., 16) TCI codepoints, which can individually update the indicated TCI states of the associated CORESET or CORESET group and apply the updated indicated TCI state to receive the single PDSCH scheduled by corresponding DCI.

Figure 3C:
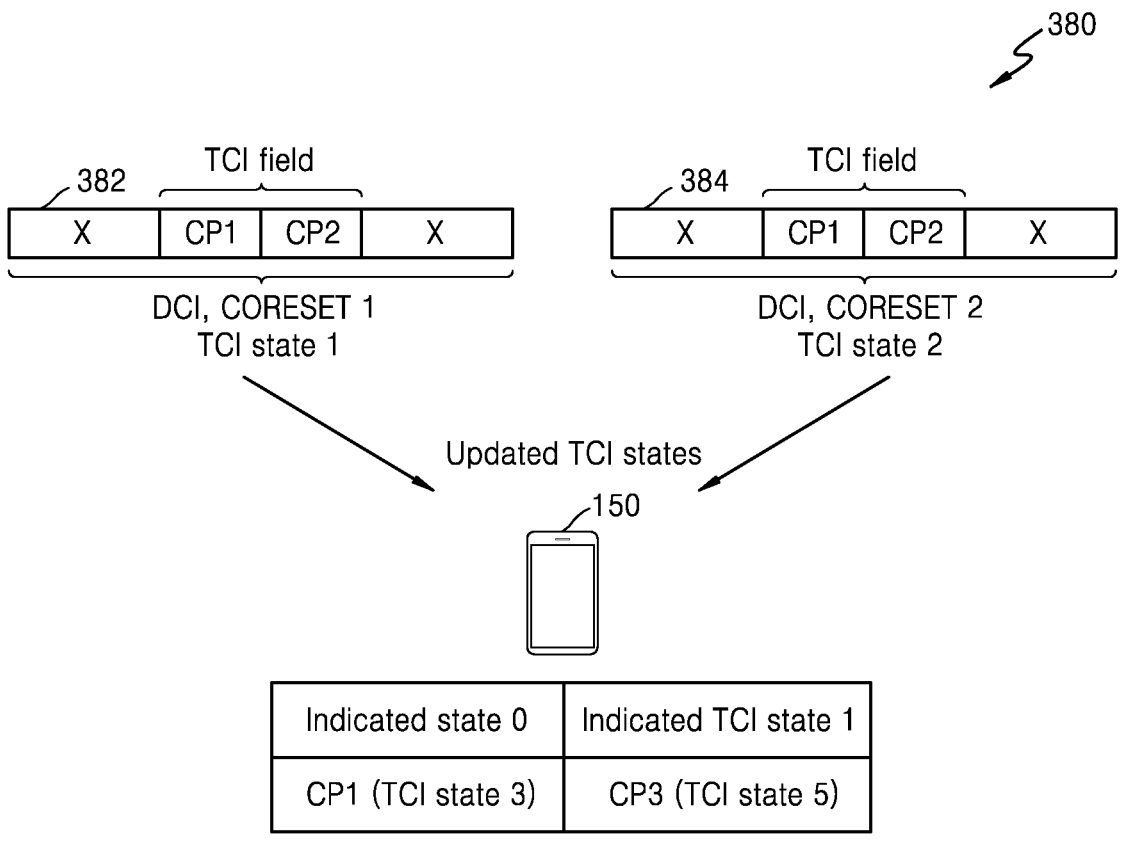
FIG. 3C is a diagram illustrating signaling of one or more indicated TCI states to receive PDSCH data from m-TRPs with multi DCI, according to an embodiment.

Referring now to FIG. 3C in conjunction with FIG. 2, a diagram illustrates signaling of one or more indicated TCI states to receive PDSCH data from m-TRPs with multi DCI, according to an embodiment. A representation 380 depicts a multi DCI scenario in which each DCI message from a TRP includes a TCI data field pointing to two TCI codepoints. As described above, each of the TCI codepoints is associated or mapped to an indicated TCI state in the look up table. When two TCI codepoints are used in the TCI data field, only one TCI codepoint is used to update the indicated TCI state. As such, the UE 150 applies only the indicated TCI states associated with one codepoint and discards the other.

As shown in FIG. 3C, each of the DCI message 382 and 384 (i.e., DCI_1 and DCI_2) include a TCI data field pointing to two codepoints (i.e., DCI_1 points to codepoints CP1 and CP2 and DCI_2 points to codepoints CP3 and CP4). In another embodiment, when the multi-DCI is received from multi TRPs, where each DCI contains the TCI state for PDSCH scheduled in same DCI, each TCI field contains two code points pointing to two indicated TCI states. The indicated TCI state represented by a second TCI codepoint (i.e., CP2 in DCI_1 and CP4 in DCI_2) are discarded and indicated TCI state represented by first code point (i.e., CP1 in DCI_1 and CP3 in DCI_2) are used to update the indicated TCI states associated with CORESET-POOLINDEX. For example, two DCI messages (DCI_1 and DCI_2) are received with a TCI state 1 and TCI state 2, respectively, and are associated with different CORESET-POOLINDEX, respectively. Also, the TCI state 1 is associated with CORESET 1 and the TCI state 2 is associated with the CORESET 2. As depicted in FIG. 3C, it is indicated that the DCI_1 includes two code points, CP1 and CP2. Similarly, the two code points of the DCI_2 are CP3 and CP 4. Hence, the PDSCH scheduled is received using the indicated TCI state associated with the first code point in the TCI data field of DC_1 and DC_2 (i.e., TCI state 3 and the TCI state 5), which is are indicated in the CP1 and CP3 and are used for scheduling PDSCH. The TCI state IDs are determined based on mapping or association in the lookup table, which stores associations between TCI state ID and codepoints. The TCI states for each codepoint are activated by MAC-CE.

The MAC-CE configures an association between PDSCH data and one or more indicated TCI states for receiving the PDSCH data. More specifically, MAC-CE is used to map the indicated TCI states for receiving PDSCH data from scheduling DCI messages. Specifically, MAC-CE may be used to configure associations which may be used to receive the PDSCH data.

In an embodiment, MAC-CE associates/maps CORESET-POOLINDEX with indicated TCI states to receive PDSCH data in scheduling DCI in the CORESET. For example, CORESETPOOLINDEX associated with TRP is mapped to an indicated TCI state of the plurality of indicated TCI state. In another embodiment, an explicit indication may be used to associate an indicated TCI state and PDSCH through MAC-CE. For example, a type of PDSCH data may be used to associate with an indicated TCI state. In yet another embodiment, TRP IDs may be used to associate an indicated TCI state and PDSCH data. For example, TRP ID (e.g., TRP #005) may be mapped to an indicated TCI state indicated TCI state 2. In still another embodiment, an explicit indication of CORESET number and an indicated TCI state may be used to associate the PDSCH data that is related to DCI scheduling the PDSCH data. For example, CORESET-POOLINDEX X may be associated with an indicated state 1. As such, when the indicated TCI state data field indicates CORESETPOOLINDEX 0, then the UE performs a search in the lookup table to identify the indicated TCI state (i.e., indicated TCI state 1), mapped/associated with the CORE-SETPOOLINDEX 0.

In another embodiment of the multi DCI scenario, the TCI data field in the DCI message may represent the indicated TCI state to be applied to the UE 150, as shown in Table 4 below. More specifically, the TCI data field indicates the TCI state of the same CORESET, or one present in the DCI field pointing to 8 or 16 TCI codepoints. The values and the functionality for the TCI date field is indicated below in Table 4. The value 1 can have any one of the functions described in the functionality.

TABLE 4

| Value | Functionality |
|---|---|
| 0 | Use the same TCI state of that CORESET for PDSCH scheduled |
| 1 | Use the TCI state indicated by DCI field for PDSCH |
| | Use the TCI state of CORESETpoolindex other than of CORESET associated with Multi DCI scenario |
| | Use both the TCI states |

FIG. 4 is a diagram illustrating signaling of one or more indicated TCI states to receive PDSCH data from one or more TRPs, according to an embodiment. In representation 400, the UE 150 may be configured for receiving PDSCH data from a single TRP (e.g., TRP 102a) or from m-TRPs (e.g., 202a and 202b) using the DCI indicating data field in the DCI message.

For example, the user 102 may be served by two TRPs (i.e., TRP 102a and TRP 102b) in a cell, (e.g., a pico cell). However, if the TRP 102b is under maintenance, then PDSCH data may not be received from the TRP 102b. In such scenarios, the UE 150 may be configured for a single TRP scenario using the DCI indicating data field of the DCI message. The DCI indicating data field applies indicated TCI states for dynamic indication of TCI states for a single TRP and multiple TRP (and can be applied to both single DCI and multi DCI), as shown in Table 5 below.

TABLE 5

| Value | Functionality |
|---|---|
| 0 | If TCI field in DCI contains mapping to only one of codepoint to update the TCI state associated with CORESET or TCI field in DCI contains mapping to 2 codepoints where 1st TCI state codepoint updates the TCI state associated with CORESET and 2nd TCI state codepoint updates the remaining indicated TCI state, if this field is set 0 only one PDSCH is received with TCI state associated with this CORESET. To use old TCI state of updated TCI to receive state depends on TDRA |
| 1 | If TCI field in DCI contains mapping to only one of codepoint to update the TCI state of associated with CORESET or TCI field in DCI contains mapping to 2 codepoints where 1st TCI state codepoint updates the TCI state associated with CORESET and 2nd TCI state codepoint updates the of the remaining indicated TCI state, if this field is set 1, 2 PDSCH are received with both the indicated TCI states. To use old TCI state of updated TCI to receive state depends on TDRA |

FIG. 5 is a diagram illustrating signaling of one or more indicated TCI states to receive PDSCH data from m-TRPs with a single DCI, according to an embodiment. Specifically, the single DCI is used to update the indicated single or multiple TCI states associated with single CORESETpoolindex for receipt of both PDSCH data.

In an example multi-DCI scenario of representation 500, when one of the DCI message does not include any indicated TCI present or the CORESET in RRC parameters list contains TCI-PresentInDCI disabled, the indicated TCI state for PDSCH data is enabled on the UE 150 from which the DCI message was scheduled. For example, DCI_1 and DCI_2 are received from TRPs 102a and 102b, respectively. The DCI_1 does not include an indicated TCI state in the TCI state data field. In such a scenario, the indicated TCI state may correspond to CORESET from which DCI_1 message was scheduled for receipt of PDSCH data.

In another example multi-DCI scenario, when one of the DCI messages does not contain any indicated TCI present, the other DCI message can be used to update and apply the indicated TCI state present in the TCI field pointing to one or more TCI codepoints. In an example multi-DCI scenario where DCI messages (i.e., DCI_1 and DCI_2) are received from TRPS (i.e., TRP 1 and TRP 2), the DCI_1 includes two TCI codepoints (i.e., CP1 and CP2) which are associated with two indicated TCI states, and the DCI_2 does not have any indicated TCI state in the TCI data field. In such cases, indicated TCI state associated with CP1 may be used for enabling receipt of PDSCH data on UE 150 from TRP 1, and indicated TCI state associated with CP2 may be used for enabling receipt of PDSCH data on UE 150 from TRP 2.

As depicted in FIG. 5, the DCI_1 message may include a TCI data field which is represented using any of the CORE-SETPOOLINDEX. The CORESETPOOLINDEX may be mapped to two unified TCI states and, as such, when DCI_2 does not have any indicated TCI states in the TCI data field, one unified TCI state may be used to update and receive PDSCH data from TRP 1 and another unified TCI state may be applied to the UE 150 to receive PDSCH data from TRP 2.

In another embodiment, the two PDSCHs scheduled by a single DCI in which one PDSCH is received with the same indicated TCI state of the CORESET, associated CORE-SETPOOLINDEX or with the same functionality as CORE-SETPOOLINDEX, in which DCI was sent and other PDSCH with remaining indicated TCI state of two indicated TCI states.

In yet another embodiment, each set of CORESETS configured in PDCCH-config may be associated with one or two TCI states with a single CORESETPOOLINDEX. Thus, one or multiple TCI states may be mapped to a PDSCH scheduled in one or multiple DCI.

In still another embodiment, each set of CORESETS configured in PDCCH-config may be associated with one or two TCI states with a single CORESETPOOLINDEX. Thus, one or multiple TCI states may be mapped to a PDSCH scheduled in a MAC CE. Further, One DCI of two DCIs may update both TCI states by selecting two TCI codepoints while both DCI scheduling PDSCH follow the TCI state of CORESETPOOLINDEX associated with the corresponding CORESETS.

In another embodiment, the CORESETPOOLINDEX is introduced or another indicator with the same functionality in DCI is mapped to the TCI states to receive the PDSCH from multiple TRPs. The values and the functionality for the values obtained upon combining the CORESETPOOLIN-DEX is as provided in the Table 6 below, which can be used for all scenarios of Table 5.

TABLE 6

| CORESETPOOLINDEX Indices | Functionality |
|---|---|
| 00 | Apply both TCI indicated states or updated TCI states configured in TCI field in to receive PDSCH. This applies 2 TCI states to single CORESETPOOLINDEX or another indicator with same functionality |
| 01 | Applies TCI states according to scheduling DCI with two codepoints chosen to update the TCI states given in this order |
| 10 | Applies TCI states according to scheduling DCI with two codepoints chosen to update the TCI states given in this order |
| 11 | Apply both TCI indicated states or updated TCI states configured in TCI field in to receive PDSCH. This applies 2 TCI states to single CORESETPOOLINDEX or another indicator with same functionality |

FIG. 6 is a flowchart illustrating a method for enabling PDSCH data from m-TRPs, according to an embodiment. A method 600 depicted in the flowchart may be executed by, for example, the UE 150. Some examples of the UE 150 include, but are not limited to, 5G smartphones or 5G cellular devices that connect over the 5G NR access network to the 5G core and further to data networks (DN), like the Internet. Operations of the flowchart, and combinations of operations in the flowchart, may be implemented by, for example, hardware, firmware, a processor, circuitry, and/or a different device associated with the execution of software that includes one or more computer program instructions. The operations of the method 600 are described herein with help of the processor 202 embodied within the UE 150. It is noted that the operations of the method 600 can be described and/or practiced by using one or more processors of a system/device other than the UE 150, for example, a system remotely placed from the UE 150 and communicably coupled with the UE 150.

At operation 602 of the method 600, at least one DCI message is received from a TRP of a plurality of TRPs in a wireless communication system, such as, by the UE 150 in the wireless communication system 100 (shown and explained with reference to FIGS. 2-5). Each DCI message includes at least a first data field, a TCI data field, and a DCI indicating data field. The first data field indicates a number of indicated TCI states to apply in the UE 150 from the at least one DCI message. The TCI data field indicates the one or more indicated TCI states to be applied for receiving the PDSCH data from the at least one TRP of the set of TRPs 202a and 202b. A MAC CE associates the PDSCH data and a corresponding indicated TCI state with one of a CORESET of a plurality of CORESETs, a codepoint, and a CORESET-POOLINDEX, in look up tables. The DCI indicating data field is used for dynamic indication of TCI states as associated with one of a TRP, and the set of TRPs 202a and 202b. Specifically, the DCI indicating data field indicates to the UE 150 if it has to be enabled for receiving PDSCH data from a single TRP or m-TRPs in the wireless communication system 100.

At operation 604 of the method 600, the UE 150 is enabled for receipt of the PDSCH data scheduled by the at least one DCI from each TRP of the set of TRPs based at least on a BAT. More specifically, each indicated TCI state of the one or more indicated TCI states are applied to the UE 150 based on the at least one DCI message. Each DCI message of the at least one DCI message is not associated with a downlink assignment, or the DCI message is associated with at least one DL assignment from the at least one TRP of the set of TRPs 202a and 202b. The PDSCH data from each TRP of the set of TRPs 202a and 202b may be received on an indicated TCI state associated with PDCCH when PDSCH TDRA scheduled is less than the BAT. Alternatively, the PDSCH data from each TRP of the set of TRPs 202a and 202b is received on the one or more indicated TCI states scheduled by the at least one DCI message when PDSCH TDRA scheduled is greater than BAT.

The sequence of operations of the method 600 need not be executed in the same order as they are presented. Further, one or more operations may be grouped together and performed in form of a single step, or one operation may have several sub-steps that may be performed in parallel or in sequential manner.

FIG. 7 is a block diagram of a UE in a wireless communication system for enabling PDSCH data from m-TRPs, according to an embodiment. The UE 700 may include a central processing unit ("CPU" or "processor") 702. The processor 702 may include at least one data processor. The processor 702 may include specialized processing units such as integrated system (bus) controllers, memory management control units, floating point units, graphics processing units, digital signal processing units, etc. The UE 700 may be analogous to the UE 150 (shown in FIG. 2).

The processor 702 may be disposed in communication with one or more I/O devices via an I/O interface 701. The I/O interface 701 may employ communication protocols/methods such as, without limitation, audio, analog, digital, monoaural, Radio Corporation of America (RCA), stereo, Institute of Electrical and Electronics Engineers (IEEE)-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the UE 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be a printer, fax machine, video display (e.g., cathode ray tube (CRT), liquid crystal display (LCD), light-emitting diode (LED), plasma, plasma display panel (PDP), organic light-emitting diode display (OLED) or the like), audio speaker, etc.

In some embodiments, the UE 700 is connected to the remote devices 712 through a communication network 709. The remote devices 712 may be peripheral devices tracking a plurality of multimedia streaming channels streamed to viewers across a geographic location. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using wireless application protocol (WAP)), the Internet, etc. Using the network interface 703 and the communication network 709, the UE 700 may communicate with the remote devices 712. The network interface 703 may employ connection protocols include, but not limited to, direct connect, Ethernet (e.g., twisted pair 10/100/1000 Base T), TCP/IP, token ring, IEEE 802.11a/b/g/n/x, etc.

The communication network 709 includes, but is not limited to, a direct interconnection, an e-commerce network, a peer to peer (P2P) network, LAN, WAN, wireless network, the Internet, Wi-Fi, 3GPP and such. The first network and the second network may either be a dedicated network or a shared network, which represents an association of the different types of networks that use a variety of protocols, for example, hypertext transfer protocol (HTTP), TCP/IP, WAP, etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc.) via a storage interface 704. The storage interface 704 may connect to memory 705 including, without limitation, memory drives, removable disc drives, etc., employing connection protocols such as serial advanced technology attachment (SATA), integrated drive electronics (IDE), IEEE-1394, USB, fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 705 may store a collection of program or database components, including, without limitation, user interface 706, an operating system 707, web server 708, etc. In some embodiments, UE 700 may store user/application data, such as, the data, variables, records, etc., as described herein. Such databases may be implemented as fault-tolerant, relational, scalable, secure databases.

The operating system 707 may facilitate resource management and operation of the UE 700.

In some embodiments, the UE 700 may implement a web browser 708 stored program component. The web browser 708 may be a hypertext viewing application. Secure web browsing may be provided using secure hypertext transport protocol (HTTPS), secure sockets layer (SSL), transport layer security (TLS), etc. In some embodiments, the UE 700 may implement a mail server stored program component. The mail server may utilize communication protocols such as Internet message access protocol (IMAP), messaging application programming interface (MAPI), post office protocol (POP), simple mail transfer protocol (SMTP), or the like. In some embodiments, the UE 700 may implement a mail client stored program component.

The method with reference to FIG. 6, or one or more operations of the UE 150 explained with reference to FIGS. 2-5 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as flash memory components) and executed on a computer (e.g., any suitable computer, such as a laptop computer, net book, Web book, tablet computing device, smart phone, or other mobile computing device). Such software may be executed, for example, on a single local computer.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, non-volatile memory, hard drives, compact disc (CD) ROMs, digital versatile discs (DVDs), flash drives, disks, and any other known physical storage media.

Various embodiments provide numerous advantages. Embodiments provide a method and system for dynamic signaling of unified TCI states to receive PDSCH in m-TRP.

More specifically, the UE 150 receives multi-DCI messages that include multiple indicated TCI states from m-TRPs to configure the UE 150 for receiving PDSCH data. The indicated TCI states are indicated in the TCI data field of the DCI message by associations, such as, TRP ID, CORESETS, CORESET POOLINDEX, code points or any external indication. As such, the UE 150 is adaptable to be configured with different associations in the TCI data field to receive the indicated TCI state. In other words, the disclosure provides different scenarios and different methods of signaling of one or more indicated TCI states using various associations. Moreover, the addition of the DCI indication data field enables the UE 150 to switch between m-TRP scenario with single DCI or multi DCI to single TRP scenario. Such techniques of dynamic signaling with various configurations of the DCI message ensure efficient transmission of PDSCH data to the UE 150 in 5G networks for m-TRP scenarios.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations or two or more recitations).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:

receiving, from a base station (BS), radio resource control (RRC) information including information configuring a plurality of transmission configuration indicator (TCI) states for a physical downlink shared channel (PDSCH), information configuring a first control resource set (CORESET), and information configuring a second CORESET, wherein the information configuring the first CORESET includes a first CORESET pool index and the information configuring the second CORESET includes a second CORESET pool index;

receiving, from the BS, a medium access control (MAC) control element (CE) activating at least one TCI state from among the plurality of TCI states, wherein the MAC CE includes a CORESET pool index field indicating that the at least one TCI state is associated with the first CORESET pool index;

receiving, from the BS, downlink control information (DCI) indicating a TCI state from among the at least one TCI state, wherein the DCI is received based on the first CORESET; and receiving, from the BS, the PDSCH by applying the TCI state based on a beam application time, wherein the TCI state is associated with the first CORESET pool index.

2. The method of claim 1, wherein the DCI is a DCI format 1_1 or a DCI format 1_2.

3. The method of claim 1, wherein the first CORESET pool index is associated with first transmit and receive point (TRP) and the second CORESET pool index is associated with second TRP.

4. The method of claim 3, wherein the DCI is transmitted from the first TRP.

5. A method performed by a base station in a wireless communication system, the method comprising:

transmitting, to a terminal, radio resource control (RRC) information including information configuring a plurality of transmission configuration indicator (TCI) states for a physical downlink shared channel (PDSCH), information configuring a first control resource set (CORESET), and information configuring a second CORESET, wherein the information configuring the first CORESET includes a first CORESET pool index and the information configuring the second CORESET includes a second CORESET pool index;

transmitting, to the terminal, a medium access control (MAC) control element (CE) activating at least one TCI state from among the plurality of TCI states, wherein the MAC CE includes a CORESET pool index field indicating that the at least one TCI state is associated with the first CORESET pool index;

transmitting, to the terminal, downlink control information (DCI) indicating a TCI state from among the at least one TCI state, wherein the DCI is received based on the first CORESET; and transmitting, to the terminal, the PDSCH by applying the TCI state based on a beam application time, wherein the TCI state is associated with the first CORESET pool index.

6. The method of claim 5, wherein the DCI is a DCI format 1_1 or a DCI format 1_2.

7. The method of claim 5, wherein the first CORESET pool index is associated with first transmit and receive point (TRP) and the second CORESET pool index is associated with second TRP.

8. The method of claim 7, wherein the DCI is transmitted from the first TRP.

9. A terminal in a wireless communication system, the terminal comprising:

a transceiver; and a controller coupled with the transceiver configured to:

receive, from a base station (BS), radio resource control (RRC) information including information configuring a plurality of transmission configuration indicator (TCI) states for a physical downlink shared channel (PDSCH), information configuring a first control resource set (CORESET), and information configuring a second CORESET wherein the information configuring the first CORESET includes a first CORESET pool index and the information configuring the second CORESET includes a second CORESET pool index, receive, from the BS, a medium access control (MAC) control element (CE) activating at least one TCI state from among the plurality of TCI states, wherein the MAC CE includes a CORESET pool index field indicating that the at least one TCI state is associated with the first CORESET pool index, receive, from the BS, downlink control information (DCI) indicating a TCI state from among the at least one TCI state, wherein the DCI is received based on the first CORESET, and receive, from the BS, the PDSCH the TCI state based on a beam application time, wherein the at least one TCI state is associated with the first CORESET pool index.

10. The terminal of claim 9, wherein the DCI is a DCI format 1_1 or a DCI format 1_2.

11. The terminal of claim 9, wherein the first CORESET pool index is associated with first transmit and receive point (TRP) and the second CORESET pool index is associated with second TRP.

12. The terminal of claim 11, wherein the DCI is transmitted from the first TRP.

13. A base station in a wireless communication system, the base station comprising:

a transceiver; and a controller coupled with the transceiver configured to:

transmit, to a terminal, radio resource control (RRC) information including information configuring a plurality of transmission configuration indicator (TCI) states for a physical downlink shared channel (PDSCH), information configuring a first control resource set (CORESET), and information configuring a second CORESET, wherein the information configuring the first CORESET includes a first CORESET pool index and the information configuring the second CORESET includes a second CORESET pool index;

transmit, to the terminal, a medium access control (MAC) control element (CE) activating at least one TCI state from among the plurality of TCI states, wherein the MAC CE includes a CORESET pool index field indicating that the at least one TCI state is associated with the first CORESET pool index, transmit, to the terminal, downlink control information (DCI) indicating a TCI state from among the at least one TCI state, wherein the DCI is received based on the first CORESET, and transmit, to the terminal, the PDSCH by applying the TCI state based on a beam application time, wherein the TCI state is associated with the first CORESET pool index.

14. The base station of claim 13, wherein the DCI is a DCI format 1_1 or a DCI format 1_2.

15. The base station of claim 13, wherein the first CORESET pool index is associated with first transmit and receive point (TRP).

16. The base station of claim 15, wherein the DCI is transmitted from the first TRP.

* * * * *